United States Patent [19]

Hazelett

[11] 4,413,835
[45] Nov. 8, 1983

[54] HITCH FOR ONE-WHEEL CYCLE TRAILERS

[76] Inventor: Richard Hazelett, P.O. Box 60, Colchester, Vt. 05446

[21] Appl. No.: 233,681

[22] Filed: Feb. 11, 1981

[51] Int. Cl.³ ............................................. B62D 63/08
[52] U.S. Cl. ..................................... 280/204; 280/78; 280/492; 403/58
[58] Field of Search ................. 280/204, 460 R, 70, 280/78, 495, 488, 489, 504, 514, 29, 202, 205, 492, 498; 403/58

[56] References Cited

U.S. PATENT DOCUMENTS

| | | | |
|---|---|---|---|
| 559,761 | 5/1896 | Tranclé-Armand | 280/204 |
| 1,311,816 | 7/1919 | Heintz | 280/204 |
| 2,212,958 | 8/1940 | Rea | 280/204 |
| 2,216,584 | 10/1940 | Boden | 280/460 R |
| 2,725,242 | 11/1955 | Peplin | 280/204 |
| 2,756,069 | 7/1956 | Manngarn | 280/492 X |
| 3,347,559 | 10/1967 | Robinson | 280/204 |
| 3,387,859 | 6/1968 | McClellan | 280/204 |
| 3,567,249 | 3/1971 | Robinson | 280/204 |
| 3,937,489 | 2/1976 | Hawes et al. | 280/204 |
| 4,325,564 | 4/1982 | Phipps | 280/204 |

FOREIGN PATENT DOCUMENTS

| | | | |
|---|---|---|---|
| 837511 | 4/1952 | Fed. Rep. of Germany . | |
| 518188 | 12/1920 | France . | |
| 654655 | 11/1928 | France . | |
| 448274 | 5/1949 | Italy | 280/204 |
| 546164 | 7/1956 | Italy | 280/492 |
| 254986 | 1/1949 | Switzerland . | |
| 17406 | of 1900 | United Kingdom | 280/204 |

*Primary Examiner*—Joseph F. Peters, Jr.
*Assistant Examiner*—Mitchell J. Hill
*Attorney, Agent, or Firm*—Parmelee, Bollinger & Bramblett

[57] ABSTRACT

In conjunction with a cycle trailer having a frame the front reach of which consists of round tubing or bar, a universal-joint hitch consisting essentially of two diametrically opposed sector bearings which are constrained to bear upon the aforesaid tubing or bar of the frame from opposite directions by suitable clamping and mounting arrangements which include thrust surfaces integral to the sector bearings.

2 Claims, 4 Drawing Figures

HITCH FOR ONE-WHEEL CYCLE TRAILERS

BRIEF SUMMARY OF THE INVENTION

The unique usefulness of one-wheel bicycle and motorcycle trailers is enhanced by a hitch of greater strength, rigidity, and durability than heretofore. The hitch is essentially a universal joint of which the key elements are two specially shaped sector bearings, with thrust surfaces integral to them.

BACKGROUND OF THE INVENTION

Figure 1:
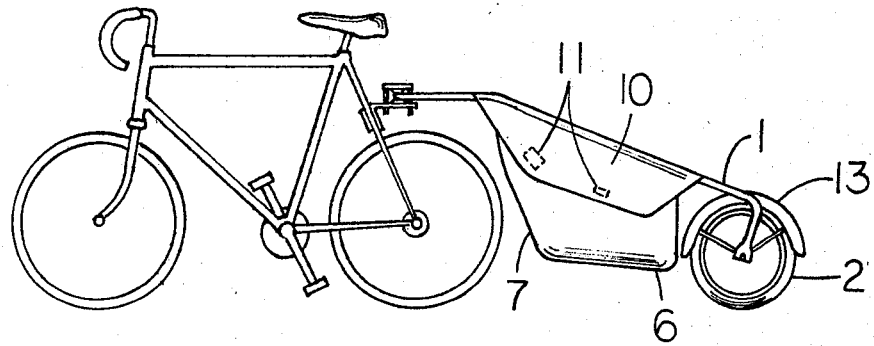
FIG. 1 shows, attached to a bicycle, the one-wheel trailer made feasible by the hitch which is the subject of this invention, all as viewed from the left side.
Figure 2:
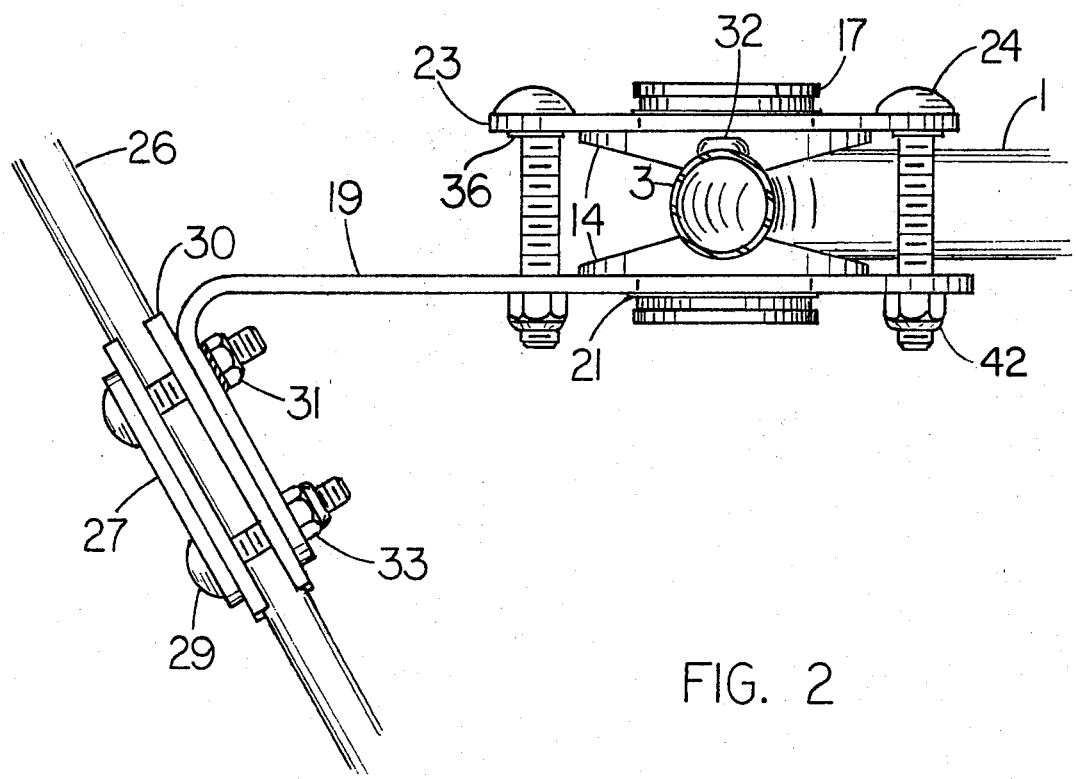
FIG. 2 shows the hitch from the left side. The side of the frame nearest to the observer has been sectioned away.
Figure 3:
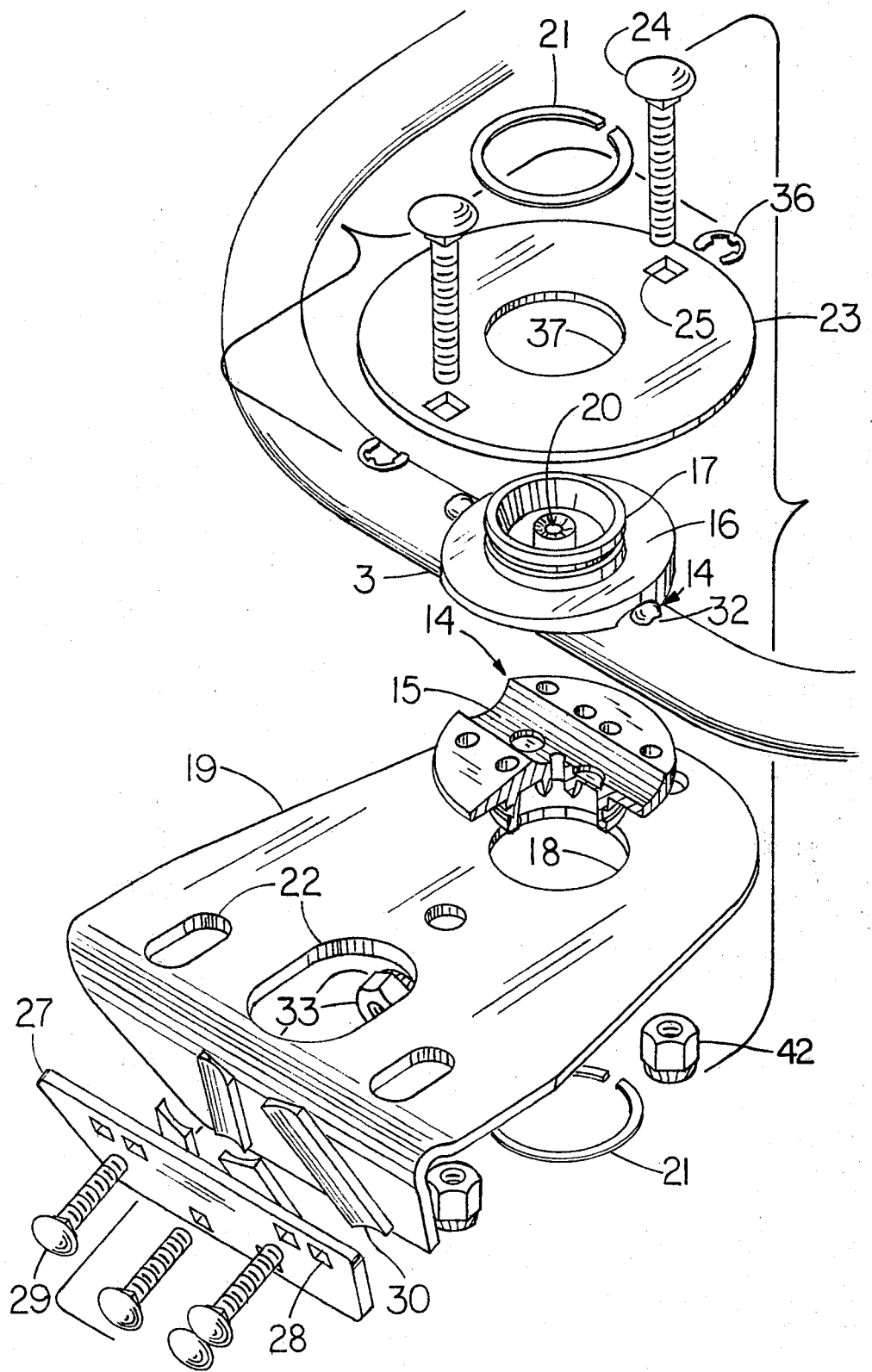
FIG. 3 shows all the parts of the hitch in an exploded view from above the front left (port side) corner of the hitch.
Figure 4:
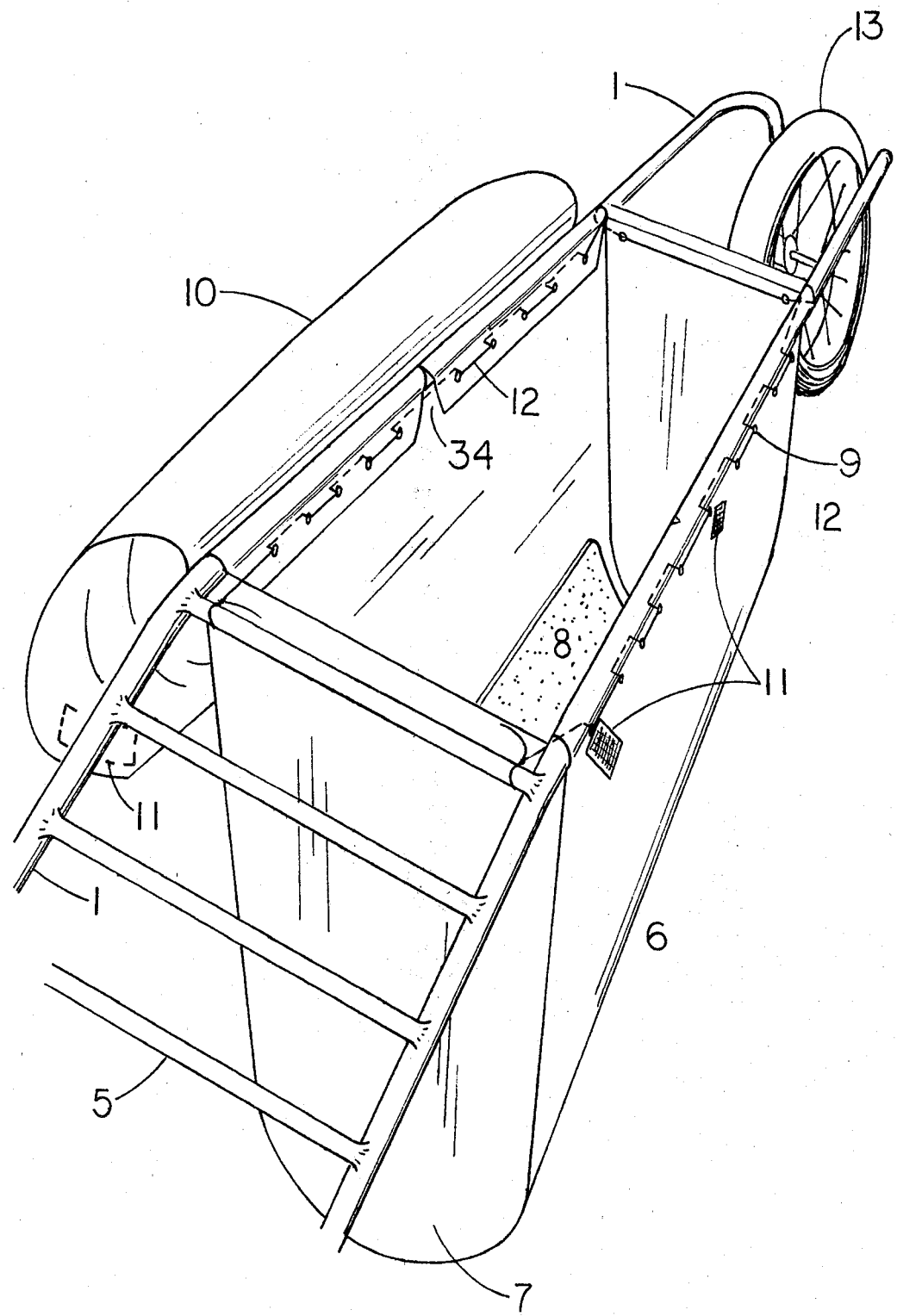
FIG. 4 shows the rear of the trailer and the bag or sack, as seen from above and from the left (port) side. The scale is smaller than FIG. 3.

Bicycle or motorcycle trailers to date have usually incorporated two wheels. However, the use of two wheels necessitates a flexible coupling to the cycle, since the cycle naturally tilts when going around corners and at other times. This means that the trailer can tip over on occasion, as when a piece of slag or a pothole is encountered by a wheel at a fair speed. To prevent this in part, the two wheels must be well spaced from each other, which adds to the cyclist's problems of avoiding obstacles such as curbstones, cars, and people, with one of the wheels.

A one-wheeled trailer pulled behind a cycle is a practical method for hauling goods and children up to one-third or perhaps more of the gross weight of cycle and rider. Such a trailer is light, comfortably narrow, runs on one narrow track, has little wind resistance, and interferes not at all with the normal operation of the cycle. But progress depends on the incorporation of a stronger, more rigid and durable hitch or coupling than heretofore available.

The hitch for a workable one-wheel cycle trailer is in essence a universal joint, that is, a device which allows the trailer to pivot about the hitch in turning (i.e., pivoting about a vertical axis) and elevating (i.e., pivoting about a transverse axis) to accomodate obstacles and changes in grade. But a universal joint in this use, while allowing these degrees of torsional freedom, does not allow the rolling degree of torsional freedom (i.e., pivoting about a longitudinal axis). All this is to say that the trailer is allowed to trail without being impeded or strained by turns or changes of grade, but it can tip over if and only if the towing cycle tips over with it.

A one-wheel cycle trailer embodying the basis for the present improvement dates back to 1914 in the patent application of Andrea Ambrosini of Italy. A French patent was issued to him in 1920, No. 518,188. Heinrich Senn-Fitz of Switzerland was granted in 1948 a Swiss patent, No. 254,986, on a hitch not much removed in principle from the present one, though his construction appeared to lack needful rigidity and freedom from the effects of rust.

Ambrosini and his several successors including Senn-Fitz used a universal joint arrangement as part of the hitch or coupling. I follow them in this, contributing my own construction which is fully practical in strength, rigidity, freedom from binding, and conformability to the vehicles involved, enabling loads of 65 pounds (30 kilograms) to be carried with ease and safety.

DESCRIPTION OF THE ACCOMPANYING TRAILER

The preferred form of the trailer frame was closely arrived at by my friend Thomas E. Coalson of Beaumont, Calif., about 1972 and not patented. The frame 1 is essentially a long, narrow "U," with forked ends to accept a wheel 2 at the rear—that is, at the top of the "U." The bottom of the "U," that is, the front, because the journal 3 for the two sector bearings 14 of plastic to be discussed later. For general bicycle use, the frame is preferably made mainly of one piece of round tubing of low-carbon, resistance-welded steel, $\frac{7}{8}$ inch (22 mm) in diameter and 0.049 inch wall (1.2 mm). This frame typically can bear a concentrated static load of 150 pounds. The cross-tubes 5 may be of similar tubing $\frac{5}{8}$ inch (15 mm) in diameter and 0.035 inch (0.9 mm) wall. Welds to attach the cross-tubes should not extend below the neutral or central axis of the main tube 1, for maximum fatigue strength.

For general utility, there is hung below the frame a sack or bag 6 of vinyl laminate upon a polyester scrim, this fabric weighing about 13 ounces per square yard or 400 grams per square meter. The polyester resists the ultraviolet in sunlight better than nylon would. No. 12 polyester sewing thread is used, and sewing is double, with back-stitching at the ends. The ends 7 of the sack may well be of darker material as the ends get dirty faster. The preferred form of bag holds two large grocery sacks easily or $2\frac{1}{2}$ cubic feet or 70 liters. Carpeting 8, which may be a discarded sample, is sewn into the bottom, using one long stitching along the centerline. The bag is laced to the frame 1 by means of forty-two $\frac{1}{4}$-inch (6 mm) holes 9 punched through the laminated fabric, with no grommets being needed. Two or three similar drain holes are punched along the bottom centerline of the bag 6. The cord used for the aforesaid lacing may be 5/32 inch (4 mm) black solid textured polypropylene cord 12, tied forward at both ends to the cross-tubes 5. The top flap 10 of the bag may be secured closed with hook-and-loop tapes 11, notably Velcro ® (Velcro being a registered trademark of the company of that name). Seam waterproofing may be done with Seamstuff ® (W. L. Gore & Associates).

The several cross-tubes 5 at the front of the frame 1 may be used for transporting strapped-down goods or for supporting a child-seat facing backwards, with the child's feet dangling into the bag. The hooks of most bungee cords fit readily over the $\frac{5}{8}$-inch round tubing, as at incision 34 for this purpose.

Sponge-rubber of sponge-plastic pipe lagging such as Rubatex ® (a registered trademark of the company of that name) may be slid onto the frame from the back on each side, say, 3-foot lengths (0.9 meter). This provides a cushion for carrying a surfboard, an important use for youths not yet of driving age who live near warm coasts.

A fender 13 is needed if passengers are to be carried on the trailer, to keep small stones from flying into their eyes. It also protects the bag 6 from the rubbing of the tire on the wheel 2, in case the bag slips backward too far. The preferred size for the single pneumatic tire for general utility is 16 inches outside diameter, with a rim of 1.75 inches width. Narrower rim and tire width would be good but is not widely available.

CHARACTERIZATION OF THE INVENTION PROPER

The invention is an improvement of the universal-joint coupling principle used by some previous inventors but with an appropriate combination of strength, rigidity, durability, simplicity, and lightness. It avoids the pitfall which may be termed "flop," which results when the axes of the universal joint occur in an inappropriate order. That is, of the two crossed pivots of a universal-joint coupling, such as the present one, the pivot bearing or bearings or journal attached to the cycle should be of vertical axis, while the pivot bearing or bearings or journal attached to the trailer should be of horizontal axis. The opposite order will allow the trailer to flop sideways, around its longitudinal axis, when the trailer is placed to nearly a right angle with respect to the bicycle, as in a sharp turn—a large nuisance.

DETAILED DESCRIPTION OF THE INVENTION PROPER

My invention is that of a hitch for a trailer such as the trailer already described. The most essential pieces are two diametrically opposed wafer-like sector bearings 14 that are preferably injection-molded of acetal resin, colored black for ultra-violet resistance and tidy appearance. Acetal is harder than nylon and is subject to far less water-softening when exposed to the weather. The sector-bearing portion 15 of each bearing 14 engages the forward reach of the trailer frame 1 at bearing journal 3 for the transverse pivot. Covering the journal with paint seems not to be troublesome. The opposite side of the sector bearing 14 is a flat annular thrust surface 16 which surface encompasses a trunnion 17. The trunnion 17 and thrust surface 16 of one of the bearings 14 is assembled into a smoothed hole 18 in the hitch tongue 19 or mounting plate, either of which is rigidly attached to the cycle. The hole 18 and trunnion 17 may be 1½ inches (38 mm) in diameter, while the outside diameter of the whole sector bearing piece 14 may be of 2½ inches (60 mm). There is a central oil hole 20. The trunnion 17 protrudes past the hole 18 in order to accomodate a snap-ring groove and plated span ring 21; the snap ring retains the sector bearing 14 when the hitch is disassembled, thereby reducing the number of loose parts to be dealt with in assembly, especially when the consumer is recoupling. Several blind holes on the underside, even in the area of the sector bearing proper 15, assist in rapid molding and also reduce warpage in molding of acetal resin; moreover, material is thereby saved. A 2-degree total taper of the trunnion 17 assists assembly.

For bicycle mounting, a hitch tongue 19 is used. This is made preferably by stamping from scale-free low carbon steel which may be either hot-rolled or commercial-quality cold rolled steel, of hardness no greater than Rockwell B 70 since it must be bent. The thickness should be about 0.134 inch (10 gauge or about 3.5 mm). If thinner, the hitch will not be rigid enough for strength in the torsional mode about the longitudinal axis, when the trailer is heavily loaded. This thickness of steel is likewise suitable for the other hitch stampings, to be discussed shortly. The trunnion hole 18 should be roller-burnished before plating, to avoid undue wear on the trunnion 17 of the sector bearing 14; roller burnishing as with a Cogsdill roller burnisher results in a finish of about 5 micro-inches roughness (0.12 micron or micro-meter). Total diametral clearance between 17 and 18 after plating may be roughly 0.004 inches (0.1 mm) or somewhat more. Cadmium or zinc plating of the stamped metal parts will protect against rusting. Clearance holes 22 for brake cables are provided in the hitch tongue 19, rendering the tongue longer than would otherwise be necessary.

The cap-plate 23 and the hitch tongue 19 together sandwich the two sector-bearings 14 against the journal 3 of the trailer frame 1. This is best done by means of carriage bolts 24, which have a square sub-head; thus when fitted into square holes 25, no wrench is needed to hold them while tightening. E-rings 36 hold the bolts 24 in position during assembly. I use 5/16-18 (8 mm) bolts, two of them, threaded to the head in order to retain the E-rings, both disposed along the centerline as shown. With this arrangement, the trailer may turn or trail at an angle of up to 70 degrees either direction, in relation to the bicycle. The nuts to tighten the bolts 24 are stop-nuts 42, i.e., nuts that turn only with the application of an appreciable torque. For customer convenience, these may be unusually large wing-stop nuts, or hand screws. However, such conveniences make stealing of the trailer easier. In any case, tightening of the nuts 25 is to be enough to prevent wobbling of the trailer. The trunnion clearance hole 37 in the cap plate 23 may preferably be 1/64 or 1/32 inch (0.5 mm) larger than the corresponding hole 18 in the torque 19 and need not be smoothed. Another spring ring 21 keeps this sector bearing 14 likewise captive.

The bicycle hitch tongue 19 is held to the rear fork 26 of the bicycle by means of a flat plate 27 containing square punched holes 28. I use six, and four of them are filled with carriage bolts 29 in any one installation; in this way, nearly all bicycle frames are accomodated. The bolts 29 are ¼ inch (6 mm) and must be tightened with care as bicycle tubing will not withstand heavy squeezing. The problem is serious enough to require four separate mounting shoes 30 to distribute the squeezing load. During assembly in the field, these shoes are temporarily adhered to the rear fork 26 with a dab of, say, clear silicone cement. Thus the shoes 30 are kept about in place but remain adjustable during the rest of the assembly. Of the four nuts used, two are preferably lock nuts 31 with serrated washers; these tighten speedily. The next two nuts 33 to be assembled are stop-nuts, which require wrenching all the way but which protect against spontaneous detachment in service.

The trailer frame 1 is prevented at its journal 3 from slipping sideways through sector bearings 14 by means of two bumps 32 of weld metal deposited on top of the frame. A piece of fairly refractory material such as asbestos house siding is placed between the bumps during welding, in order to obtain weld bumps that are sharply defined and so can act as thrust absorbers against impact. This is important, since bicycles do fall over. The impact on an attached trailer is significant. The bumps of weld metal 32 seem to perform best when added to the top of the frame tubing 1 rather than to the bottom, possibly because the rising sideways sliding friction of the bearings 14 on the journal 3 absorbs some of the energy of impact.

I have described my preferred embodiment of my invention as being the most practical for bicycles. Other embodiments are possible, especially for mopeds and motorcycles, and may finally prove desirable. One simple change would be the inversion of the whole bearing sandwich by hanging it under the hitch tongue 19 instead of placing it on top. This would constitute a form of adjustment for cycles of different heights in back.

Again, the two bolts 24 might be replaced with one central bolt, thereby simplifying uncoupling and recoupling, while at the same time increasing the trailing angle available. However, this change would require a gap in the journal 3 of the trailer frame 1, or some equivalent arrangement.

Although the invention has been herein shown and described in what is conceived to be the most practical and preferred form for one kind of towing vehicle, it is recognized that departures may be made therefrom within the scope and spirit of the invention, which is not to be limited to the details disclosed herein but it is to be accorded the full scope of the claim so as to embrace any and all equivalent devices and apparatus.

Having described my invention, what I claim as new and desire to secure by Letters Patent is the following:

1. For use in conjunction with a one-wheel trailer having a normal upright position and adapted to be pulled by the frame of a "cycle," such as a bicycle, motorcycle or moped, universal-joint hitch apparatus comprising:
    a trailer frame for said one-wheel trailer having a transverse elongated frame member with a cylindrical rounded surface,
    said elongated frame member extending horizontally transverse to the length of said one-wheel trailer when said trailer is in said normal upright position,
    mounting means including attachment means for attaching said mounting means to the frame of the cycle for pulling the one-wheel trailer,
    upper and lower wafer-like annular sector bearing elements positioned one above the other in spaced parallel relationship,
    each of said sector bearing elements having a cylindrical concave bearing surface extending transversely horizontally across the respective element,
    said upper sector bearing element being positioned above said elongated frame member with the concave bearing surface thereof engaged down against the cylindrical rounded surface of said elongated frame member,
    said lower sector bearing element being positioned below said elongated frame member with the concave bearing surface thereof engaged up against the cylindrical rounded surface of said elongated frame member with said elongated frame member being journaled between the respective concave bearing surfaces of said upper and lower sector bearing elements for providing a transverse pivot axis,
    said upper sector bearing element having an upwardly projecting centrally located trunnion with an upwardly facing thrust surface encircling said trunnion,
    said lower sector bearing element having a downwardly projecting centrally located trunnion with a downwardly facing thrust surface encircling said latter trunnion,
    said two trunnions being aligned for defining a vertical pivot axis,
    said mounting means having a hole for receiving one of said trunnions and having a surface complementary with the thrust surface which encircles said one trunnion for engaging against said thrust surface,
    a cap plate having a hole for receiving the other of said trunnions,
    said cap plate having a surface complementary with the thrust surface which encircles said other trunnion for engaging against said latter thrust surface, and
    clamping means urging said cap plate and said mounting means toward each other.

2. For use in conjunction with a one-wheel trailer adapted to be towed behind the frame of a two-wheeled vehicle having a normally upright position with said trailer normally being in an upright position directly behind and in longitudinal alignment with said vehicle, universal-joint trailer hitch apparatus comprising:
    a front transverse reach of a trailer frame extending horizontally transversely to the length of said one-wheel trailer when said trailer is in said normally upright position,
    said front transverse reach having a generally cylindrically rounded shape,
    two sector journal bearings having, upon one side of each, a concave, essentially cylindrical sector-journal-bearing surface, each of which bearing surfaces is constrained from opposite directions to bear against, and to capture between them, said cylindrically rounded shaped front reach of the trailer frame at diametrically opposed locations with respect to said front reach,
    said sector journal bearings being positioned respectively above and below said front reach for defining a transverse pivot axis which is horizontal when said trailer is in said normally upright position,
    each of said sector journal bearings having as its opposite side an annular thrust-bearing surface at least one of which surfaces encompasses a trunnion whose axis extends vertically when said trailer is in its normally upright position,
    mounting means for attachment to the frame of said two-wheeled vehicle,
    said mounting means defining a bearing for receiving said trunnion and for cooperating with the annular thrust-bearing surface which encompasses said trunnion for defining a pivot axis extending generally vertically when said vehicle is in said normally upright position,
    a bearing member cooperating with the annular thrust bearing surface of the other sector journal bearing, and
    clamping means for urging said bearing member toward said mounting means.

* * * * *